(12) United States Patent
Gudaitis et al.

(10) Patent No.: US 7,286,261 B2
(45) Date of Patent: Oct. 23, 2007

(54) COLOR CALIBRATION COLOR VALUE CORRECTION

(75) Inventors: Algird M Gudaitis, Vancouver, WA (US); William Lester Plishker, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 987 days.

(21) Appl. No.: 09/970,278

(22) Filed: Oct. 2, 2001

(65) Prior Publication Data

US 2003/0063338 A1    Apr. 3, 2003

(51) Int. Cl.
*G06F 15/00* (2006.01)

(52) U.S. Cl. .......... 358/1.9; 358/2.1; 358/504; 358/505; 358/515; 358/520; 347/19

(58) Field of Classification Search .......... 358/1.9, 358/2.1, 504, 505, 515, 520; 347/19
See application file for complete search history.

(56) References Cited

U.S. PATENT DOCUMENTS

| | | | |
|---|---|---|---|
| 6,036,298 A | 3/2000 | Walker | |
| 6,157,469 A | 12/2000 | Mestha | |
| 6,160,912 A | 12/2000 | Usami | |
| 6,284,445 B1 * | 9/2001 | Keech et al. | 430/495.1 |
| 6,623,096 B1 * | 9/2003 | Castano et al. | 347/19 |
| 2002/0149799 A1 * | 10/2002 | Hayashi | 358/406 |

FOREIGN PATENT DOCUMENTS

| | | |
|---|---|---|
| EP | 1029516 | 8/2000 |
| EP | 1071275 | 1/2001 |
| JP | 09-314911 | 12/1997 |
| WO | WO0213136 | 2/2002 |

* cited by examiner

*Primary Examiner*—Kimberly Williams
*Assistant Examiner*—Michael Burleson

(57) ABSTRACT

Correcting color values for color calibration is disclosed. A sensor measures a color calibration pattern output by a device, to color values for the patch. Corrective action(s) are then performed on the color values. A first such action corrects for measurement corruption of a patch color of the patch resulting from the sensor erroneously measuring adjacent patch colors to the desired patch color. A second action corrects for non-parallel motion of the sensor while measuring the patch. A third corrective action corrects for ambient light detected by the sensor while measuring the patch, without necessarily filtering the sensor. A final action corrects for slow-drift measurement corruption of the patch, by both scaling and offsetting the color values.

12 Claims, 13 Drawing Sheets

CORRECT MEASUREMENT
CORRUPTION OF PATCH COLOR

CORRECT AMBIENT LIGHT DETECTED

CORRECT SLOW-SKEW
MEDIUM CORRUPTION

COLOR CALIBRATION COLOR VALUE CORRECTION

FIELD OF THE INVENTION

This invention relates generally to devices that can output color, such as color printers, and more particularly to color calibration for such devices.

BACKGROUND OF THE INVENTION

Color printers have become exceedingly popular. Previously, such printers were mainly used only for professional purposes, since their cost could run into the thousands of dollars. Professional artists and entities concerned with printing color images and documents on various types of media had at their disposal high-end printers that could generate very life-like color prints. More recently, however, the cost of color printers, including laser printers but more usually inkjet printers, has plummeted, resulting in their purchase by home users and other non-professionals. With the advent of applications like digital photography, such low-cost color printers are increasingly being used to print color prints of photos, computer-drawn images, and other types of documents.

Regardless of the type of color printer, color calibration is an important process for color printers and other types of devices. Color calibration generally is the matching of colors to a base color, such as a Pantone color, from one device to another. For example, matching the color one sees on a computer display to that of printer output is within the realm of color calibration. Calibration maintains color consistency from print job to print job, from one day to the next, and so on. Calibration is especially important when maintaining critical colors, such as colors in company logos, production of multiple prints in a single print job, production of various jobs, and so on. Modem color printers can produce excellent color output, but colors tend to drift over time, causing consistency and other problems for users.

A color calibration routine can contain a test target of a number of color patches that range from 0 to 100% ink coverage for each ink color the printer uses. The purpose of this test target is to allow users to evaluate ink coverage. After printing the calibration target, users typically read the target with a device that generates density or other types of values, which are entered into the calibration routine to determine the adjustment necessary to provide for matched colors. Density values in particular provide a numeric value that correlates to ink film thickness, where high density values relate to heavier ink coverage, and lower density values relate to lighter ink coverage. Devices that can measure such density and other values include colorimeters, spectrophotometers, and other types of devices. A common type of color calibration routine is referred to as linearization, in which a straight-line relationship between color input and color output is determined.

A difficulty with color calibration is that the measurements taken by the color calibration devices, referred to herein generally as color values, can exhibit a number of different problems. For example, it is difficult to confine the measurement region to just the color patch in front of the sensor of the device. Even if 99% of the light reaching the sensor is from the patch of interest, this still means that 1% comes from other areas. Thus, neighboring color patches can affect the measured value of the patch under observation if they are significantly different in color.

Furthermore, the sensors of the color calibration devices are typically sensitive to variations in height. Light targeted on the media by the sensors will move into and out of the field of view of the sensor with a change in height. Any kind of bow in the platen or any non-parallel motion of the carriage, where the device is attached to the carriage, will result in skewed values. Ideally the only light component captured by the sensor is due to the light targeted on the media by the sensor. More practically, however, the color calibration device operates in an area where a non-trivial amount of other, ambient light is detected by the sensor. This ambient light artificially adds a component to the color values, corrupting them.

Finally, effects such as thermal changes, current sink setting inaccuracies, and so on, can impact the values read by the sensors. These effects are usually slow enough that they do not affect a single scan, but rather affect scans performed over time. The result is that patches read by the same sensors of the same devices may generate different color values from one hour to the next, and from one day to the next, causing inconsistent color calibration. For these and other reasons, therefore, there is a need for the present invention.

SUMMARY OF THE INVENTION

The invention relates to correcting color values for color calibration. A sensor measures a color calibration pattern output by a device, to yield color values for each patch of the color calibration pattern. One or more corrective actions are then performed on the color values. A first such action corrects for measurement corruption of a patch color of the color calibration pattern resulting from the sensor erroneously measuring adjacent patch colors to the desired patch color. A second action corrects for non-parallel motion of the sensor while measuring the color calibration pattern. A third corrective action corrects for ambient light detected by the sensor while measuring the color calibration pattern, without necessarily filtering the sensor. A final action corrects for slow-drift measurement corruption of the color calibration pattern, by both scaling and offsetting the color values. Still other embodiments and aspects of the invention will become apparent by reading the detailed description that follows, and by referring to the drawings.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Overview

Figure 1:
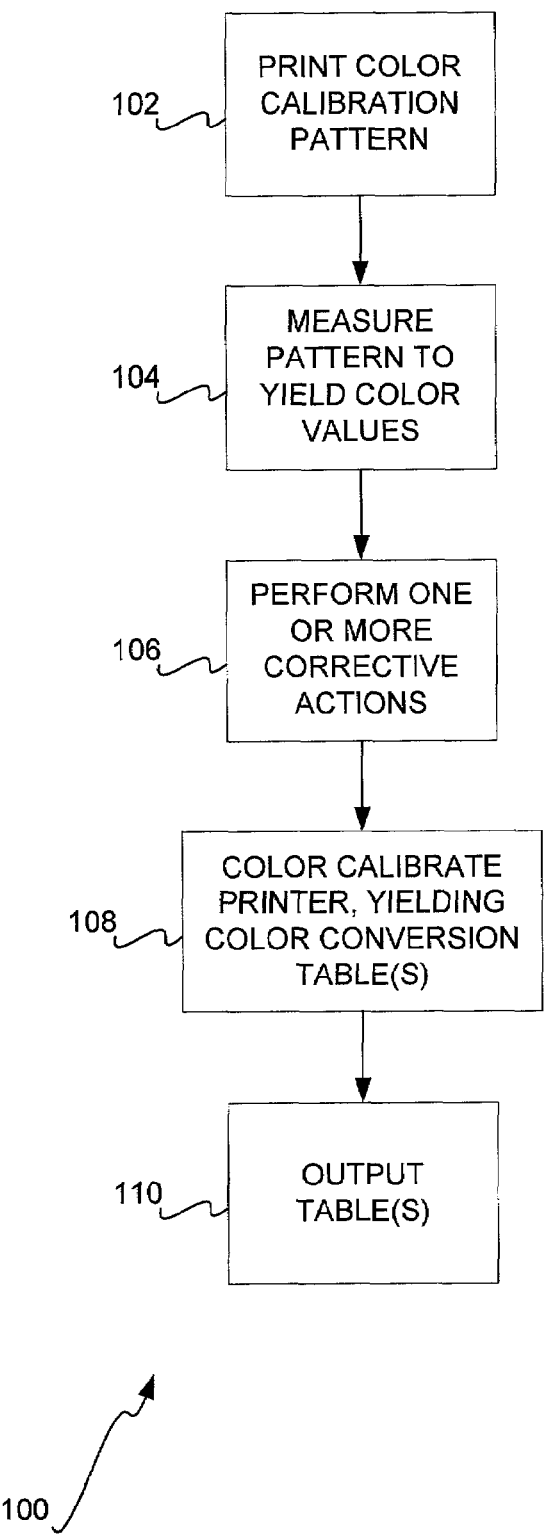
FIG. 1 is a flowchart of a color calibration method according to an embodiment of the invention.

FIG. 1 shows a method 100 according to an embodiment of the invention. The method 100 may be performed by execution of a computer program by a processor of a computerized device. The computer program may be stored on a computer-readable medium, such as a removable or permanent storage medium like a floppy disk drive or a hard disk drive, or a volatile or non-volatile memory. The functionality of each step or act of the method 100 may be performed by corresponding and/or respective means of the computer program. The computerized device may be a computer, the device to be color calibrated, such as a printer, as well as another type of device.

A color calibration pattern is first printed by a printer, or otherwise generated (102). The printer may be the device to be color calibrated. The color calibration pattern is on which basis color calibration of the printer is to be performed. Generally, the color calibration pattern is generated according to a given color type according to which color calibration is to be performed. For instance, the color type may be CMY, where the sample is printed by a printer having cyan, magenta, and yellow ink colors. Other color types include RGB, for red, green, and blue colors, and HSB, for hue, saturation, and brightness, among others. Two other color types, CIEXYZ and CIELAB, are defined by the Commission Internationale de l'Eclairage. For linearization color calibration, the color calibration pattern may have a number of different colors that range from 0 to 100% ink coverage for each ink color that a given printer or other device uses. Other types of color calibration are also amenable to the invention, however.

Next, the patches are measured by a sensor of a color calibration device, to yield color values (104). The color calibration device may be external or internal to the printer or other device to be color calibrated. For example, the color calibration device may be a sensor embedded in the printer, measuring the sample substantially concurrent with printing of the sample by the printer. The color calibration device may also be an external tool that measures the sample after the printer has printed it. Types of color calibration devices include densitometers, calorimeters, and spectrophotometers. For example, a densitometer measures the numeric value that correlates to ink film thickness, where high density values indicate heavier ink coverage, and lower density values indicate lighter ink coverage. These density values are the raw data of the sample measured by the densitometer. Other types of raw data include spectrum data from a spectrophotometer, and colorimetric data from a colorimeter.

One or more correction actions, as described in more detail in subsequent sections of the detailed description, are then performed relative to the measured color values (106), to render the color values more accurate. Color calibration is performed for the device based on the color values as have been measured and on which corrective action(s) have been performed (108). The color calibration compares the measured color values with the ideal or desired colored values. One or more color conversion tables are generated that map the former to the latter, so that subsequent output on the device yields the desired color as the actual color. These tables are finally output (110), for subsequent use by the device being calibrated.

As an example of color calibration, the desired value of a given yellow color patch may be 85%, whereas the measured value of the patch may be only 80%. In a linearization color calibration, a printer may thus be calibrated so that when a yellow density value of 85% is specified, the printer actually outputs more yellow ink. Therefore, the actual measured yellow density value will in fact be 85%, and not 80% as occurred prior to calibration.

Patch Color Measurement Corruption Correction

Figure 2:
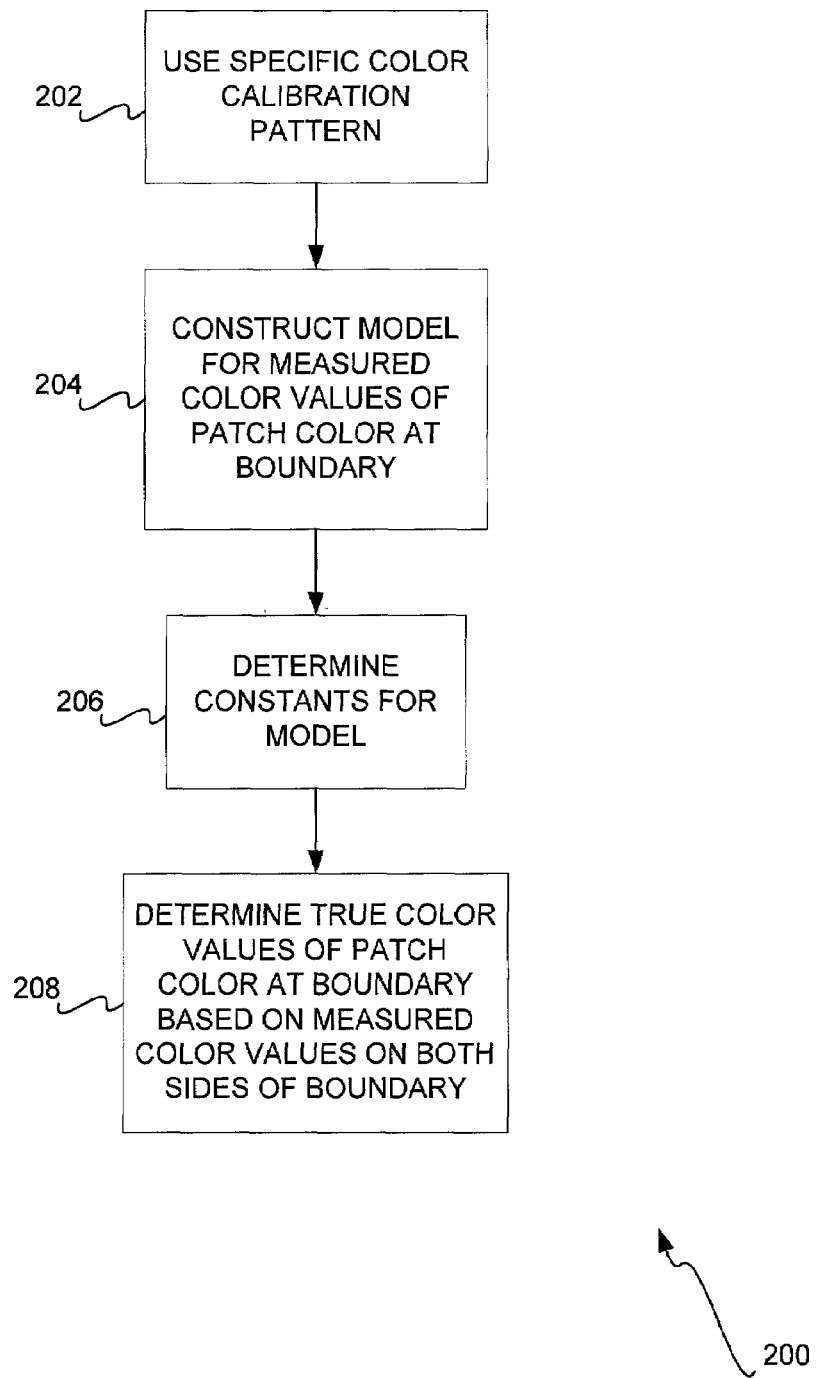
FIG. 2 is a flowchart of a method to correct for measurement corruption of a patch color, according to an embodiment of the invention.
Figure 3:
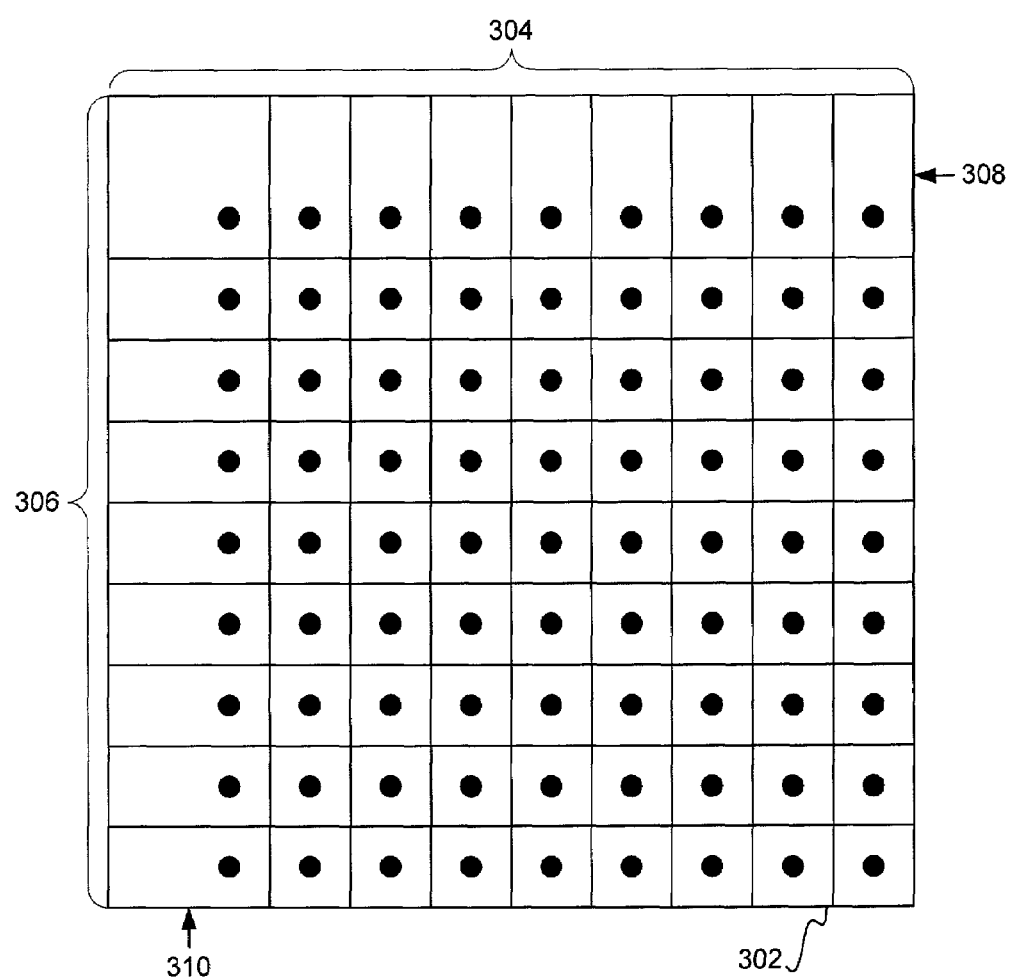
FIG. 3 is a diagram of a color calibration pattern having a number of different colors for color calibration purposes, according to an embodiment of the invention.

FIG. 2 shows a method 200 for correcting patch color measurement corruption. Generally, it is difficult to confine the measurement region to just the color patch in front of the sensor of the device. Therefore, the method 200 is performed for alleviating this difficulty. First, preferably a specific color calibration pattern is used (202). The pattern has a number of patch colors, where each patch color has a number of adjacent patch colors. The patch colors are organized by color attribute similarity. The darkest of the patch colors have a larger patch size than the other patch colors do. FIG. 3 shows an example of such a specific color calibration pattern 302. The patch colors are organized into columns 304 and rows 306. The darkest patch colors at the edge of the pattern are double in width and/or height, as indicated by the row 308 and the column 310.

The dark positions within the patch colors of the pattern 302 indicate preferable positions at which the sensor performs a measurement. In the small boxes, the sensor performs a measurement at the center thereof. In the doubly wide boxes in the column 310, the sensor performs a measurement at the center of the right half thereof. In the doubly high boxes in the row 308, the sensor performs a measurement at the center of the bottom half thereof. In the largest box in both the row 308 and the column 310, in the upper left-hand corner, the sensor performs a measurement at the center of the bottom right quarter of the box. Thus, the sensor preferably moves an equal distance between measuring positions, regardless of the size of the patch color that it is measuring.

For instance, 293 specific colors may exist in the specific color calibration pattern used. They are placed in specific rows and columns so that physically adjacent colors, above and below, and to the left and to the right, have similar color attributes. However, this may leave gaps within the pattern through which the blank media is shown. To ensure that these gaps do not cause measurement corruption problems themselves, some colors, such as thirty colors, may be repeated to fill in any gaps within the patch. Use of this specific pattern reduces the measurement corruption, because the difference in color between the color being considered and the surrounding colors multiplied by the fraction of total sensor light captured from the surround colors is what causes the corruption. Small differences in physically adjacent colors, however, result in less corruption.

The use of doubly high and/or doubly wide in size colors in the darkest or most colorful edges of the pattern further reduces measurement corruption. At the edges of the color calibration pattern, there are no more colors to place next to the colors of interest, so measurement corruption results from the whiteness of the blank media on one or two sides of the color. However, if the color is lightly colored and substantially white, the blank media will not create significant error. If the color is not lightly colored and not substantially white, then the use of doubly wide and/or doubly high in size colors for the edges reduces corruption. Thus, a dark corner color is doubled in size in both width and height.

Referring back to FIG. 2, the method 200 further compensates for any corruption remaining by performing 204, 206, and 208. First, a model is constructed for the measured color values of a given patch color, at a boundary between the patch color and one of its adjacent patch colors (204). This model is based on the measured value being equal to a first constant times a color value to one side of the boundary, plus a second constant times a true color value of the patch color, plus a third constant times a color value to another side of the boundary. The true value of the patch color is preferably taken as the measured color value at a middle or center position within the patch color, for a sufficiently large patch. The constants for the model are determined (206), so that the true color values of the patch color at the boundary can be determined from the measured color values of the patch color and its neighbors, using the model (208).

Figure 4:
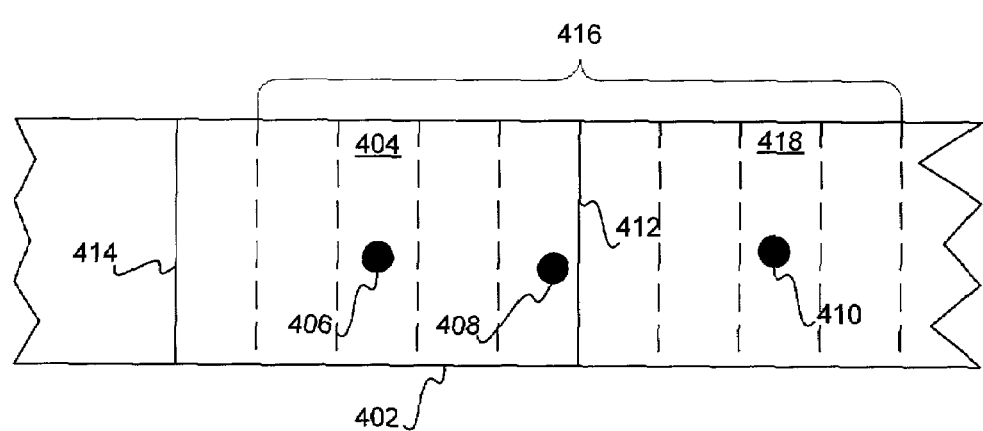
FIG. 4 is a diagram showing how measurement corruption of a patch color can be corrected for, according to an embodiment of the invention.

FIG. 4 depicts pictorially how this model is constructed and used. A portion of the color patch 402 includes a color 404 having boundaries 412 and 414, and a color 418 sharing the boundary 412. The boundaries 412 and 414 are the right and left boundaries of the color 404, but alternatively can be the top and bottom boundaries of the color 404. With specific respect to the right boundary 412, three color values are measured at different positions. The position 406 is in the center of the color 404 far from the boundary 412, and used to measure the true value of the color 404. The position 408 is within the color 404, but nearer the boundary 412, and the position 410 is outside the color 404 and far from the boundary 412. That is, the position 410 is within the color 418. The dotted lines 416 separate different patches within each color, such as the color 404 and the color 418. Thus, the position 406 is within a middle patch of the color 404, whereas the position 408 is within the patch of the color 404 closest to the boundary 412. The position 410 is within a middle patch of the color 418.

The model is constructed by determining the constants, such that for color values near the boundary 412, these measured values are equal to the first constant times the true color value at the position 408, plus the second constant times the true color value at the position 406, plus the third constant times the true color value at the position 410. During color scanning, the true value of a color, the center color value, can be determined from the measured color values at each of the other positions. This model is accurate because the corruption resulting from far-away neighbors is nearly zero. For instance, color values of the patch in which the position 408 lies is corrupted by its neighbors extending to either side of the patch, including not immediately adjacent neighbors. However, the corruption that results from patches not immediately adjacent to the patch in which the position 408 lies is nearly zero.

Mathematically, $Y_n$ and $X_n$ can be defined as the sensed, or measured, and actual values of patch n, respectively. For a middle patch, $$Y_2 = K_1 X_1 + K_2 X_2 + K_3 X_3, \quad (1)$$

where n=2 is the middle patch, and n=1 and n=3 are the patches immediately adjacent to the middle patch. Furthermore, $$K_1 + K_2 + K_3 \equiv 1. \quad (2)$$

Equations (1) and (2) are an approximation that is accurate because the corruption from non-adjacent neighbors of the middle patch is nearly zero. However, more accurately, $$Y_2 = \sum_{j=1}^{m} K_j, \quad (3)$$

where n=1 is the farthest neighbor of the middle patch to one side, and n=m is the farthest neighbor of the middle patch to the other side.

When n=2 is a patch having neighbors of the same color, such as the position 406 of the color 404 and the position 410 of the color 418, then all values of $X_n$ and $Y_n$ are the same. That is, $$X_n = Y_n, n \in \{1,3\}. \quad (4)$$

However, for a step change in patches, such as the position 408 of the color 404, where there is a boundary between two different colors, such as between the color 404 and the color 418, this is not the case. Rather, $Y_{before} = X_{before}$, patch far away to left of boundary $Y_{after} = X_{after}$, patch far away to right of boundary $Y_{t-}$ = sensed value before boundary $Y_{t+}$ = sensed value after boundary (5)

That is, for patches not at a boundary, because their neighbors are of the same color, the sensed value is assumed to be the true value. For example, the measured value of the patch encompassing the position 406 is assumed to be the true value for this patch and for the color 404 in general, whereas the measured value of the patch encompassing the position 410 is assumed to be the true value for this patch and the for the color 418 in general.

Conversely, the patch encompassing the position 408 has a measured value $Y_{t-}$ that is corrupted by the patch to the right side of the boundary 412, of the color 418. Thus, using equation (1), $$Y_{t-} = K_1 X_{before} + K_2 X_{before} + K_3 X_{after}, \qquad (6)$$

where the true value $X_{t-}$ is also $X_{before}$. Therefore, using equation (5)

$$K_3 = \frac{Y_{before} - Y_{t-}}{X_{before} - X_{after}} = \frac{Y_{before} - Y_{t-}}{Y_{before} - Y_{after}}. \qquad (7)$$

Similarly, $$Y_{t+} = K_1 X_{before} + K_2 X_{after} + K_3 X_{after}, \qquad (8)$$

and $$K_1 = \frac{Y_{after} - Y_{t+}}{X_{after} - X_{before}} = \frac{Y_{after} - Y_{t+}}{Y_{after} - Y_{before}}. \qquad (9)$$

Because $K_1$ and $K_3$ are now determined, $K_2$ can also be determined be subtracting equation (6) from equation (8), or, $$Y_{t+} - Y_{t-} = K_2 X_{after} - K_2 X_{before}. \qquad (10)$$

Therefore, $$K_2 = \frac{Y_{t+} - Y_{t-}}{X_{after} - X_{before}} = \frac{Y_{t+} - Y_{t-}}{Y_{after} - Y_{before}}. \qquad (11)$$

To determine $X_2$, then, equations (7), (9), and (11) are solved for $K_3$, $K_1$, and $K_2$, respectively, and then used in equation (1), which along with using equation (4) and straightforward algebra yields $$X_2 \cong \frac{Y_2 - K_1 Y_1 - K_3 Y_3}{K_2}. \qquad (12)$$

That is, the actual value of the patch encompassing the position 408 can be determined solely from the measured value of this patch, as well as the measured values of the patch encompassing the position 406 ($Y_1$) and of the patch encompassing the position 410 ($Y_3$). The actual value is indicated as substantially equal in equation (12) because, as previously indicated, it is assumed that only the nearest neighbor patches to the patch n=2 contribute all the corruption. While this is substantially true, it is not 100% true.

The above mathematical description can further be extended so that the corruption resulting from more than the immediate two neighbors of a given patch is also compensated for, as can be appreciated by those of ordinary skill within the art. As an example, for a true color value of 50, considering just the two immediate neighbors may yield a corrected color value of 49.65, whereas considering a total of four neighbors, two to the left and two to the right, may yield a corrected color value of 49.97. This difference exists because the neighbor two patches away also affects the immediately adjacent neighbor on each side, since the true values of the immediately adjacent neighbors are also not known.

Therefore, for considering the two adjacent neighbors, and how their adjacent neighbors affect them, the following equation can be used, the derivation of which is algebraically comparable to that accomplished for equation (12):

$$X_2 \cong \frac{K_2 Y_2 - K_1 Y_1 - K_3 Y_3 + K_1^2 Y_0 + K_3^2 Y_4}{K_2^2 - 2K_1 K_3}. \qquad (13)$$

In this equation, $Y_0$ is the measured value of the neighboring patch two patches away to the left from the middle patch, and $Y_4$ is the measured value of the neighboring patch two patches away to the right from the middle patch. This equation is also an approximation, but is more accurate than equation (12). Thus, the 49.97 value in the example above could result from using equation (13), and the 49.65 value could result from using equation (12).

Non-Parallel Motion Measurement Corruption Correction

Figure 5:
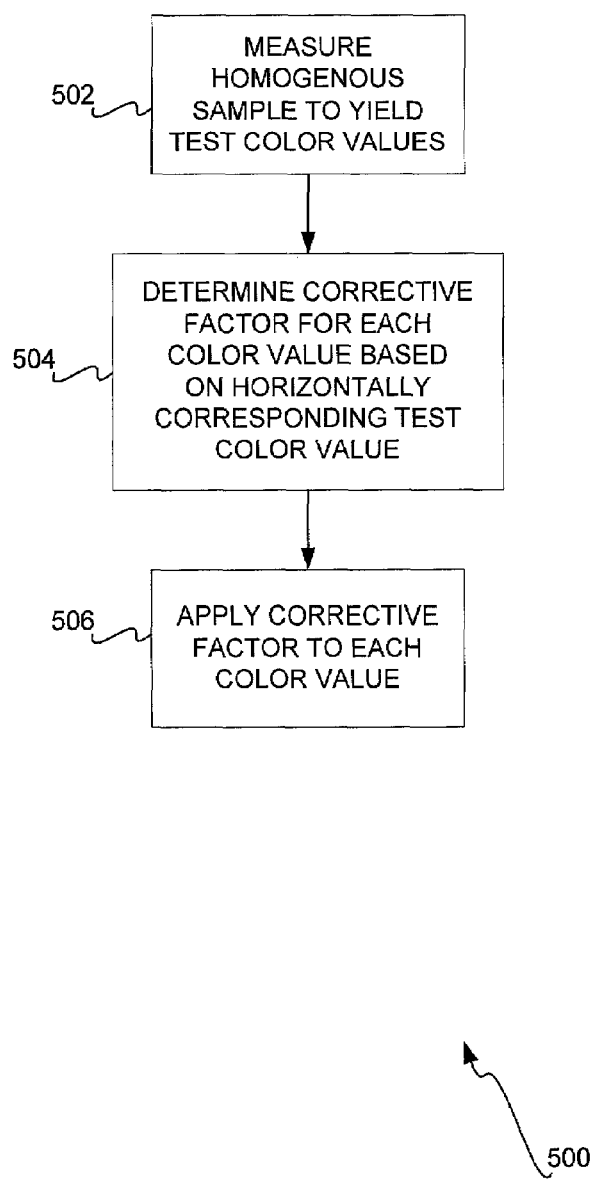
FIG. 5 is a flowchart of a method to correct for non-parallel motion of a sensor, according to an embodiment of the invention.

FIG. 5 shows a method 500 for correcting corruption resulting from non-parallel motion of the sensor of the color calibration device. Any kind of bow in the platen or any non-parallel motion of the carriage, where the device is attached to he carriage, may result in skewed values. Therefore, the method 500 is performed for alleviating this difficulty. First, a homogenous sample is measured to yield test color values (502). The homogenous sample is preferably a non-printed on, white section of the media on which the color patch also is or is to be printed. The color values of the media detected by the sensor should be constant, such that variations among the test color values indicate non-parallel motion of the sensor.

Therefore, a corrective factor for each color value is determined, based on a horizontally corresponding test color value (504). The corrective factor is meant to normalize the color values to take into account the non-parallel motion of the sensor reflected by the test color values. The corrective factors are then applied to the color values measured for each color patch (506). Thus, where a test color value at a given sensor position indicates that non-parallel motion occurs at this position, a corrective factor for the color value of the color patch measured at this same sensor position is applied to the color value, to correct for and take into account the non-parallel motion.

Figure 6:
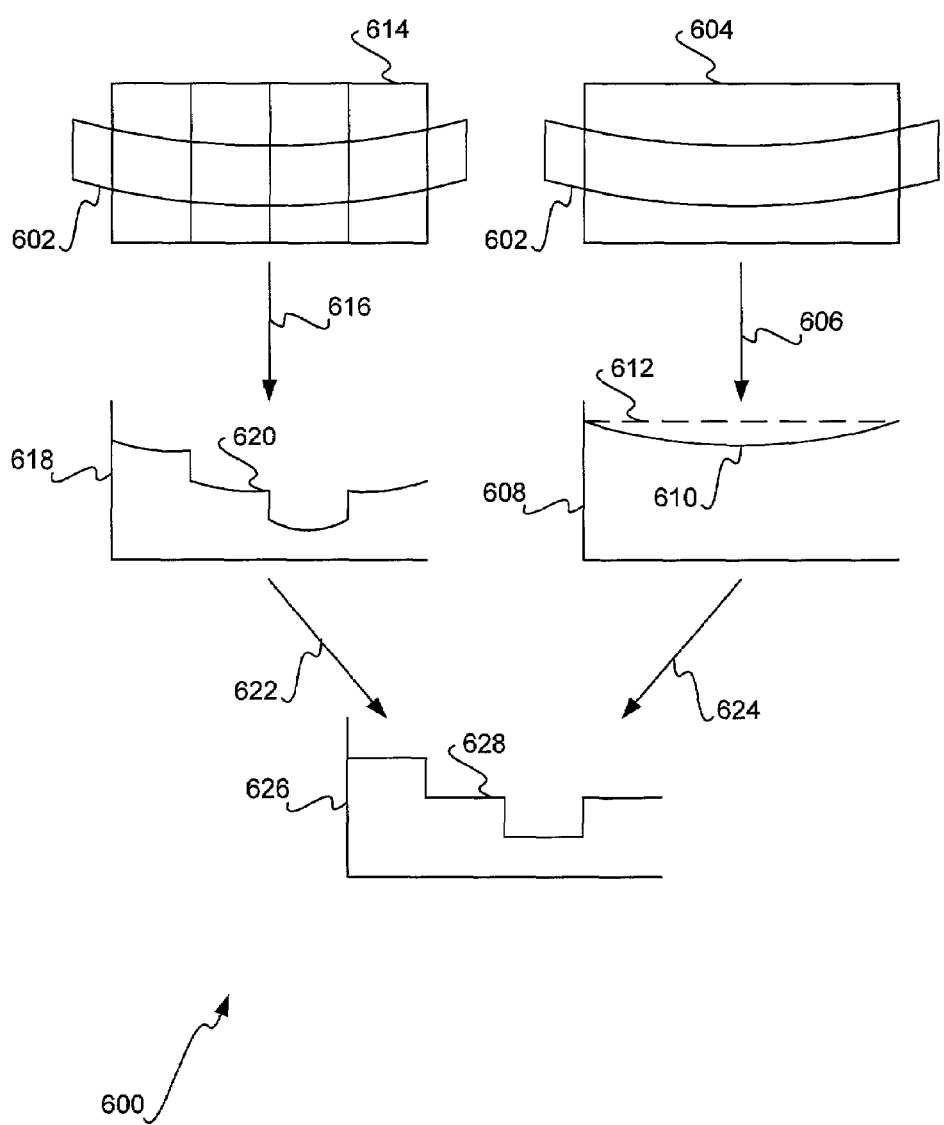
FIG. 6 is a diagram showing how non-parallel motion of a sensor can be corrected for, according to an embodiment of the invention.

FIG. 6 shows a diagram 600 depicting pictorially the correction for non-parallel motion of the sensor. A homogeneous sample 604 is measured with a sensor having non-parallel motion as indicated by the curved strip 602 to yield test color values, as indicated by the arrow 606. The graph 608 shows that the test color values, which should conform to a constant value as indicated by the dotted line 612, actually have a variation to them, as indicated by the line 610. Therefore, when the color pattern 614 is measured by the sensor with the non-parallel motion indicated by the curved strip 602, this yields color values of the color pattern 614, as represented by the data value line 620 of the graph 618, as indicated by the arrow 616, which is corrupted by this non-parallel motion.

A scaling corrective factor is determined at each horizontal position of the graph 608, to take into account that the actual test color values reflected by the line 610 deviate from the true test color values reflected by the line 612. For example, for a scaling corrective factor, if the true test color value is 0.85, but the measured test color value is 0.80, then the corrective factor is 0.85 divided by 0.80, or approximately 1.06. This factor, when multiplied to the measured value, yields the true value.

The corrective factors determined from the graph 608 are applied to the color values of the patch represented in the graph 618, as indicated by the arrows 624 and 622, to result in the graph 626, having the true color values of the color path as indicated by the line 628. For example, for the scaling corrective factor of 1.06 described in the previous paragraph, if the color value of the color patch at this same horizontal position were 0.40, the true color value would be 0.40 times 1.06, or about 0.42. It is noted that an offset factor can be used in conjunction with the scaling factor, similar to the manner described below with respect to slow-drift corruption compensation.

Ambient Light Measurement Corruption Correction

Figure 7:
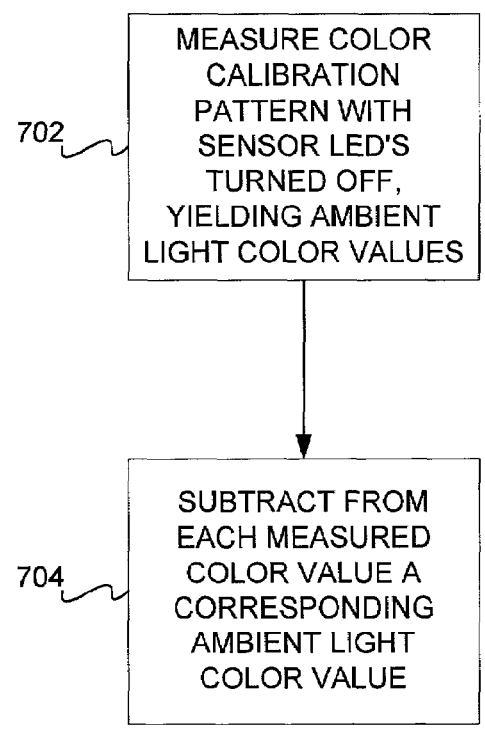
FIG. 7 is a flowchart of a method to correct for ambient light detected by a sensor, according to an embodiment of the invention.

FIG. 7 shows a method 700 for correcting measurement corruption resulting from detection of ambient light. Ideally, the only light component captured by the sensor is due to the light targeted on the media by the sensor. More practically, however, the light-sensing device operates in an area where a non-trivial amount of other, ambient light is detected by the sensor. Therefore, the method 700 is performed for alleviating this difficulty. First, the color calibration pattern is measured with the sensors with its light-emitting diodes (LED's), or other type of lights, off (702). This yields the ambient light sensor values. The light sensor values are then subtracted from the color values measured with the LED's, or other types of lights, on (704). This corrects for the ambient light being detected. That is, for a given measured color value, a corresponding ambient light sensor is subtracted therefrom to correct for detection of ambient light. It is noted that the other types of light may be, for example, a fiber optic strand(s), incandescent light, fluorescent light, electrical luminescent (EL) panels, and so on.

The measurement corruption correction of the method 700 can be performed without filtering the light captured by the sensor to decrease ambient light corruption. However, sensor filtering may still be accomplished, but this is not necessary for the method 700 to achieve its desired results. Filtering generally only takes into account the optical effect of ambient light. However, the compensation performed by the method 700 also takes care of the dark voltage, which is the non-zero output of the sensor when its light is off, and which is an electrical effect. Thus, even with filtering, the method 700 may also be desired to be used, to compensate for the dark voltage, and not just the optical effect of ambient light.

Figure 8:
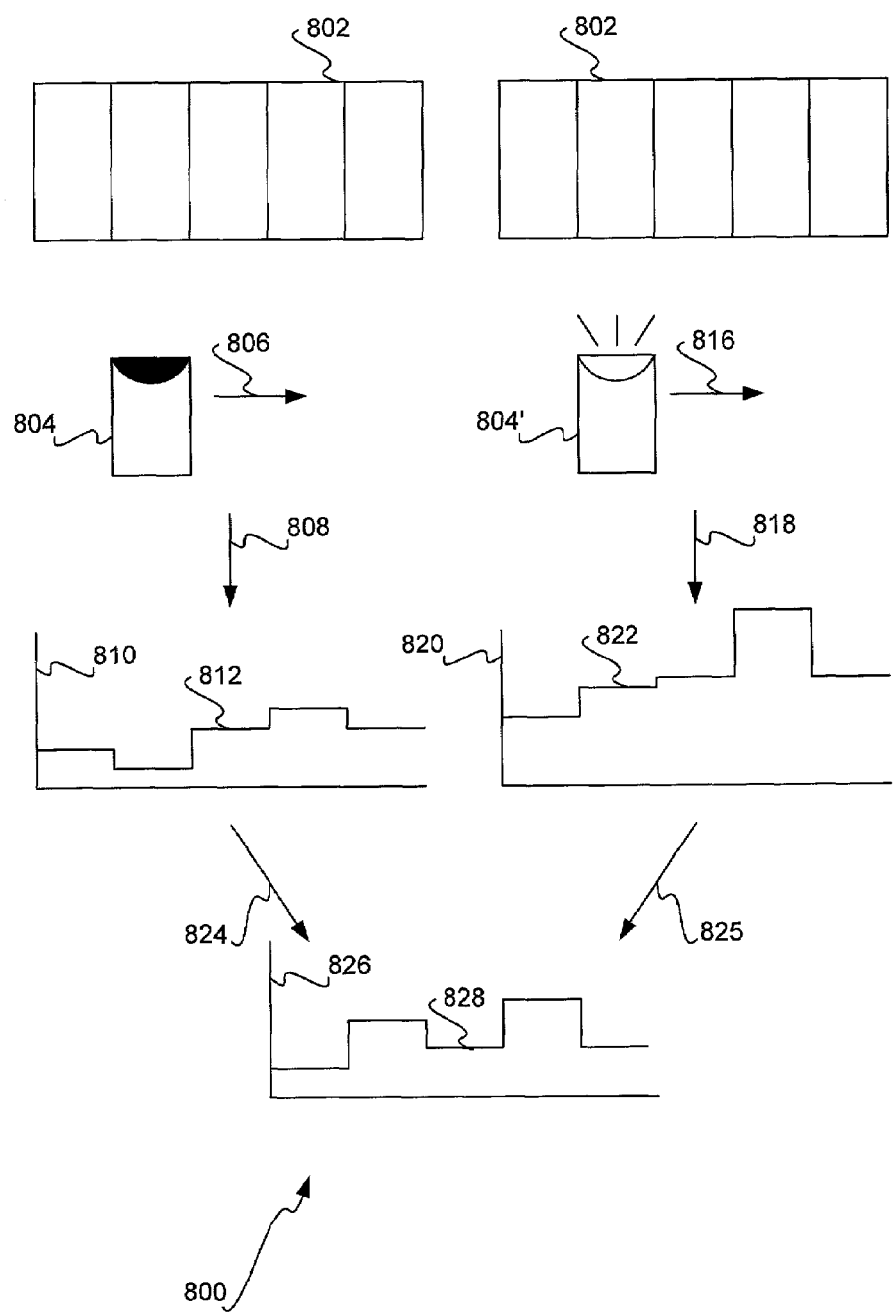
FIG. 8 is a diagram showing how ambient light detected by a sensor can be corrected for, according to an embodiment of the invention.

FIG. 8 shows a diagram 800 depicting pictorially the correction for ambient light. First, the color pattern 802 is measured by the sensor 804 with the lights of the sensor 804 being off. The sensor 804 travels from left to right, as indicated by the arrow 806. As indicated by the arrow 808, this results in the graph 810, having a line 812 indicating the ambient light sensor values. Next, the color pattern 802 is measured by the sensor 804 with its lights on, where the sensor 804 with its lights on is indicated as the sensor 804'. The sensor 804' again travels from left to right, as indicated by the arrow 816. As indicated by the arrow 818, this results in the graph 820, having a line 822 indicating the measured values, but which are corrupted by detection of ambient light. Note that the motion from left to right of the sensor 804 and the sensor 804' is an example only, and either sensor can travel left to right or right to left, or in another manner, independent of the other.

As indicated by the arrows 824 and 825, the ambient light sensor values represented by the line 812 of the graph 810 are subtracted from the measured values represented by the line 822 of the graph 820. This yields the graph 826, having a line 828 representing the measured values as have been corrected for detection of ambient light. For each value of the line 822 of the graph 820, a horizontally corresponding value of the line 812 of the graph 810 is subtracted therefrom, to yield a corresponding corrected value of the line 828 of the graph 826.

Slow-Drift Measurement Corruption Correction

Figure 9:
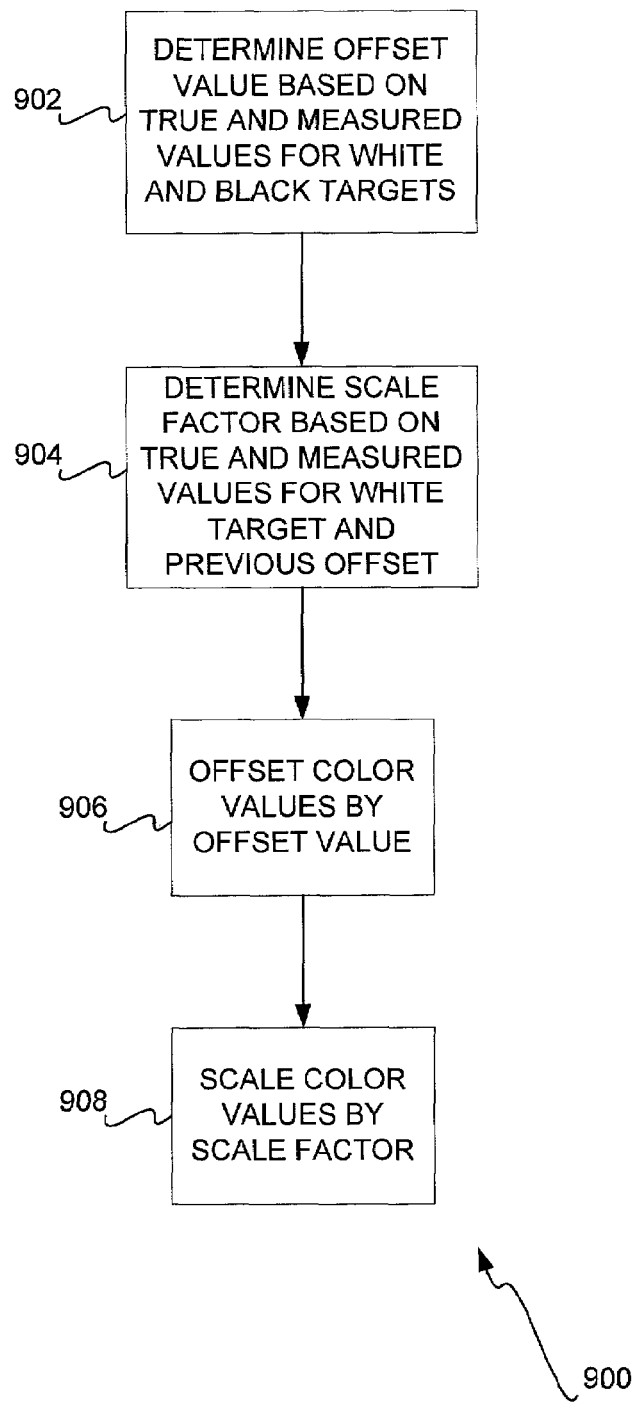
FIG. 9 is a flowchart of a method to correct for slow-drift measurement corruption, according to an embodiment of the invention.

FIG. 9 shows a method 900 for correcting slow-drift measurement corruption. Effects such as thermal changes, current sink setting inaccuracies, and so on, can impact the values read by the sensors. These effects are usually slow enough that they do not affect a single scan, but rather affect scans performed over time, and thus are referred to as slow-drift effects. Therefore, the method 900 is performed for alleviating this difficulty. First, an offset value is determined, based on the true and measured values for two separated targets, such as a white or relatively light target, and a black or relatively dark target (902). A scale factor is determined based on the true and measured values for the relatively light or white target and the previously determined offset (904). The measured color values are offset by the offset value (906), and then scaled by the scale factor (908), to correct for slow-drift measurement corruption. It is noted that whereas values have been indicated as true in this paragraph, such values are assumed to be true values, such that subsequent slow drift causes them to become corrupted. More accurately, however, the values are initial values, from which slow drift results in later corrupted measured values.

More specifically, the offset value and scale factor are determined as follows. The initial, assumed to be true values for each of the white and the dark targets are the initially measured values for these targets, or $$M_{w1}=A_w$$

$$M_{b1}=A_b, \quad (14)$$

where $M_{w1}$ is the initial measured value of the white target, $M_{b1}$ is the initial measured value of the black target, $A_w$ is the actual value of the white target, and $A_b$ is the actual value of the black target. After slow-drift effects have occurred, the white and black targets are measured again, yielding measured values $M_{w2}$ and $M_{b2}$, respectively. These values are modeled as being scaled by the scale factor and offset by the offset value, such that $$M_{w2}=A_wF+O$$

$$M_{b2}=A_bF+O, \quad (15)$$

where F is the scale factor and O is the offset value.

Since $A_w$ and $A_b$ are known as a result of equation (14), and $M_{w2}$ and $M_{b2}$ are measured values, there are two equations and two unknowns in equation (15), allowing for straightforward algebraic calculation to lead to $$O = \frac{M_{w2}M_{b1} - M_{w1}M_{b2}}{M_{b1} - M_{w1}}, \quad (16)$$

where the offset value has been solved for first. Furthermore, solving for the scale factor in each of the equations in equation (15) leads to $$F = \frac{M_{w2} - O}{M_{w1}} = \frac{M_{b2} - O}{M_{b1}}. \quad (17)$$

Since generally the white target values are larger than the black target values, the first equality in equation (17) is the preferred manner by which to determine the scale factor, because it will be less susceptible to noise.

Figure 10:
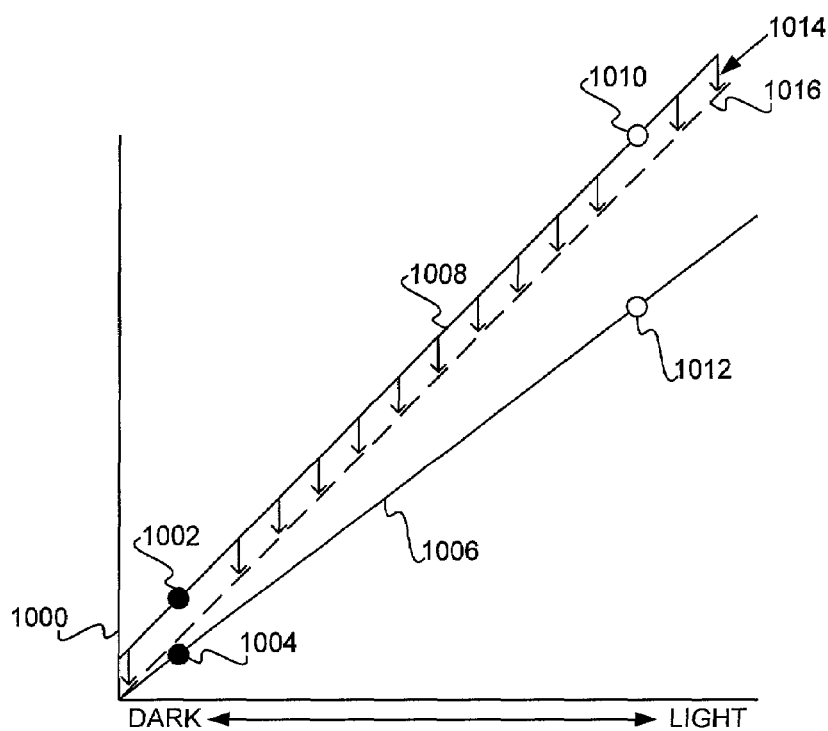
FIG. 10 is a graph showing how slow-drift measurement corruption can first be corrected for by performing an offset operation, according to an embodiment of the invention.
Figure 11:
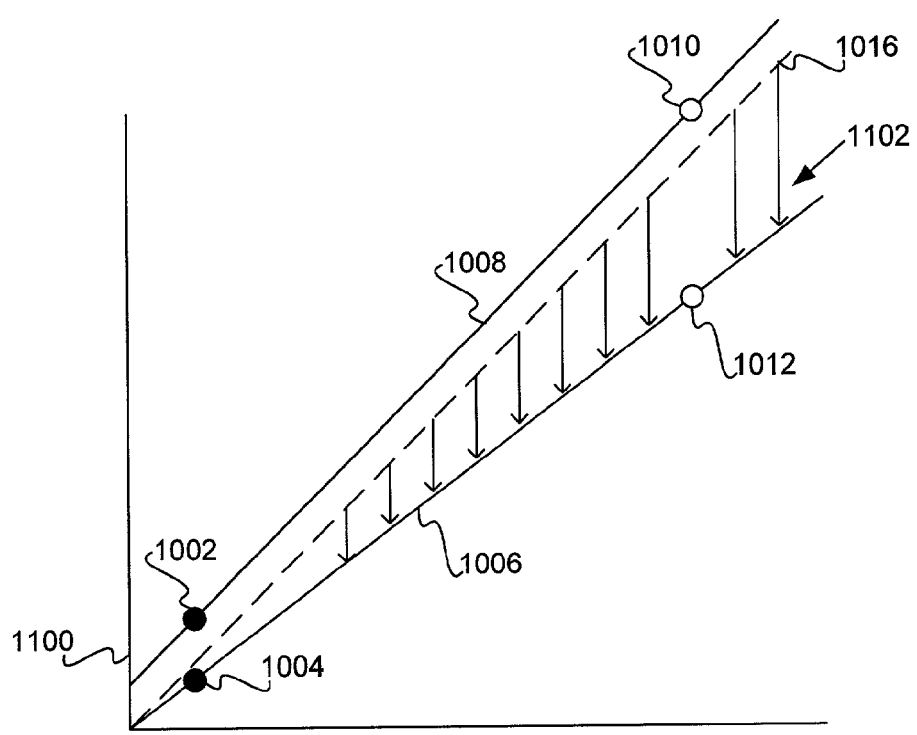
FIG. 11 is a graph showing how slow-drift measurement corruption can second be corrected for by performing a scaling operation, according to an embodiment of the invention.

FIGS. 10 and 11 show graphs 1000 and 1100, respectively, depicting pictorially how the offset value and then the scale factor are applied. First, FIG. 10 shows a graph 1000 depicting pictorially how the offset value is applied. The point 1002 indicates the measured color value for the black target, whereas the point 1004 indicates the true color value for the black target. Similarly, the point 1010 indicates the measured color value for the white target, whereas the point 1012 indicates the true color value for the white target. The line 1006 is the true color value line, and is defined by a line intersecting the points 1004 and 1012. The line 1008 is the measured color value line, and is defined by a line intersecting the points 1002 and 1010. By applying the offset value to the measured value line 1008, an offset-corrected line 1016 is determined. That is, the offset value (or, more accurately, its opposite) is added to each color value of the line 1008, to yield the line 1016. FIG. 11 shows a graph 1100 depicting pictorially how the scale factor is applied to the offset-corrected line 1016 of FIG. 10. The scale factor is applied to the offset-corrected line 1016, to yield the true line 1012, or substantially the true line 1012. That is, the scale factor (or, more accurately, its inverse in the case of FIG. 11) is multiplied to each color value of the line 1016, to at least substantially yield the true line 1012.

Example Computer and Printer

Figure 12:
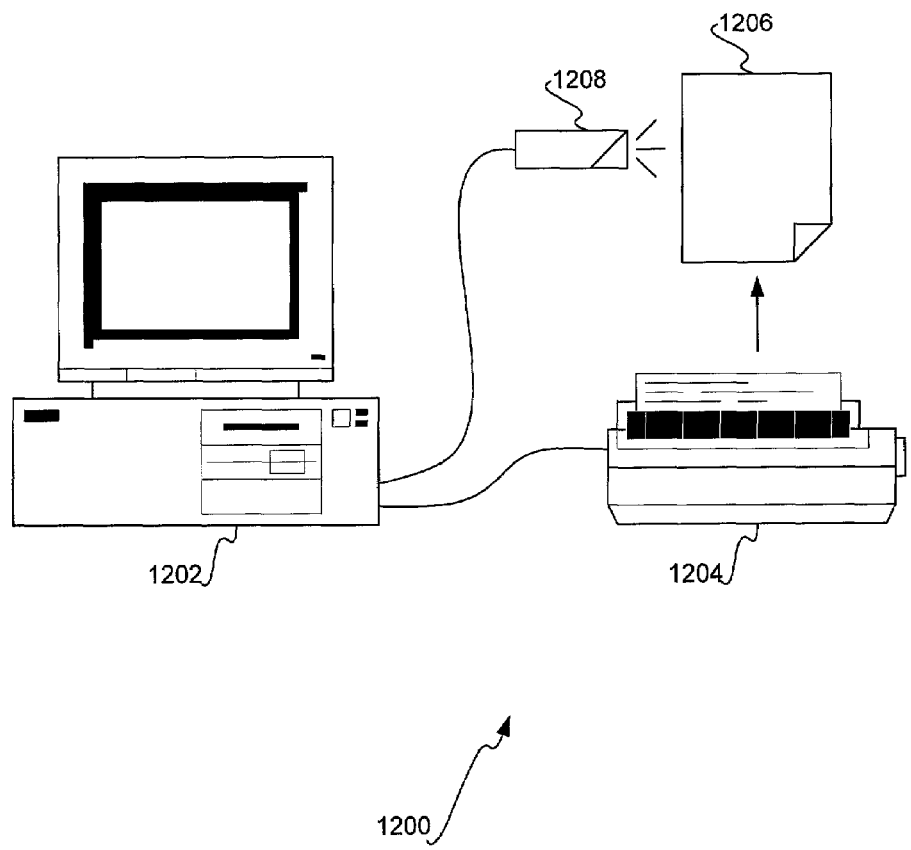
FIG. 12 is a diagram of a system in which color calibration can be performed, according to an embodiment of the invention.
Figure 13:
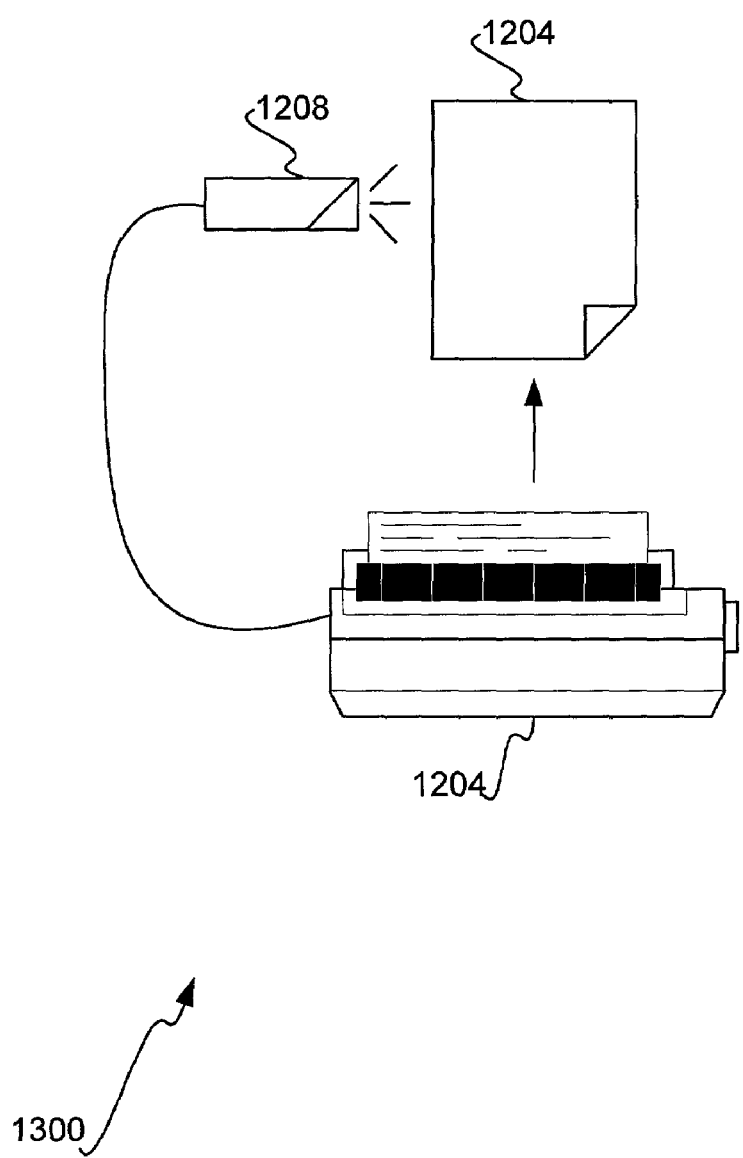
FIG. 13 is a diagram of another system in which color calibration can be performed, according to an embodiment of the invention.

FIGS. 12 and 13 show differing systems 1200 and 1300 in which color calibration according to embodiments of the invention can be implemented. In FIG. 12, the printer 1204 generates media with a color pattern 1206. A color calibration device 1208 is communicatively coupled to the computer 1202. By comparison, in FIG. 13, the printer 1204 still generates the media with the color pattern 1206, but the color calibration device 1208 is communicatively coupled to the printer 1204. Whereas color calibration device 1208 is shown in FIGS. 12 and 13 as an external tool, it may also be an internal or embedded tool to the printer 1204.

Conclusion

Embodiments of the invention provide for advantages not found within the prior art. Significantly, measurement corruption of color values read by a sensor of a color calibration device is reduced. One or more of four different types of measurement corruption can be compensated for by embodiments of the invention. The first type is patch color measurement corruption, resulting from some of the color value of a color resulting from an adjacent color. The second type is non-parallel motion measurement corruption, resulting from non-parallel motion of the sensor during measurement. The third type is ambient light measurement corruption, resulting from ambient light being detected by the sensor during measurement. Finally, the fourth type is slow-drift measurement corruption, resulting from slow-drift effects occurring over time.

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. As an example, whereas the invention has been substantially described in relation to color calibration of a printer, it is also applicable to color calibration of other devices, such as monitors and other types of displays. This application is intended to cover any adaptations or variations of the present invention. Therefore, it is manifestly intended that this invention be limited only by the claims and equivalents thereof.

We claim:

1. A method comprising:
measuring, by a sensor, a color calibration pattern output by a device to yield color values for the color calibration pattern; and,
correcting for measurement corruption of a patch color of the color calibration pattern resulting from the sensor erroneously measuring adjacent patch colors to the patch color by at least constructing a model for measured color values of the patch color at a boundary between the patch color and one of the adjacent patch colors as equal to a first constant times a color value to one side of the boundary, plus a second constant times a true color value of the patch color, plus a third constant times a color value to another side of the boundary, and using the model constructed,
wherein the true value of the patch color is taken as a measured color value at a middle position within a large patch color having a uniform color to that of the patch color.

2. The method of claim 1, further performing color calibration of the device based on the color values after the at least one corrective action have been performed on the color values, the color calibration yielding one or more color conversion tables for subsequent use with the device.

3. The method of claim 1, further comprising at least one of:
initially ordering the color calibration pattern so patch colors having similar color attributes are adjacent to one another; and,
initially ordering the color calibration pattern so that one or more of the number of patch colors that have a substantially extreme color attribute as compared to surrounding patch colors have a larger patch size than other of the number of patch colors do.

4. The method of claim 1, wherein the color calibration pattern has a number of patch colors including the patch color and the adjacent patch colors, organized by color attribute similarity, one or more of the number of patch colors that have a substantially extreme attribute as compared to surrounding patch colors having a larger patch size than other of the number of patch colors do.

5. A system comprising:
a printer;
a media having printed thereon by the printer a color calibration pattern having a number of patch colors organized by attribute similarity, one or more darkest of the number of patch colors having a larger patch size than other of the number of patch colors do;
a sensor measuring color values of the color calibration pattern; and,
a color calibration mechanism to color calibrate the printer based on the color values measured by the sensor, yielding one or more color conversion tables for use with the printer during subsequent printing.

6. The system of claim 5, wherein the number of patch colors of the color calibration pattern are organized into rows and columns according to the color attribute similarity.

7. The system of claim 5, wherein the color calibration mechanism further corrects for measurement corruption of a patch color of the color calibration pattern resulting from the sensor erroneously measuring adjacent patch colors to the patch color.

8. The system of claim 5, wherein the color calibration mechanism comprises means for correcting measurement corruption of a patch color of the color calibration pattern resulting from the sensor erroneously measuring adjacent patch colors to the patch color.

9. The system of claim 5, wherein the color calibration mechanism and the sensor are part of the printer.

10. The system of claim 5, further comprising a computer, the color calibration mechanism part of the computer.

11. A computer-readable medium having a computer program stored thereon for execution by a processor, the computer program comprising:
   means for receiving color values of a color calibration pattern output by a device as measured by a sensor;
   means for color calibrating the device based on the color values to yield one or more color conversion tables for use with the device during subsequent use; and,
   means for correcting for measurement corruption of a patch color of the color calibration pattern resulting from the sensor erroneously measuring adjacent patch colors to the patch color by at least constructing a model for measured color values of the patch color at a boundary between the patch color and one of the adjacent patch colors as equal to a first constant times a color value to one side of the boundary, plus a second constant times a true color value of the patch color, plus a third constant times a color value to another side of the boundary, and using the model constructed,
   wherein the true value of the patch color is taken as a measured color value at a middle position within a large patch color having a uniform color to that of the patch color.

12. The medium of claim 11, wherein the means for correcting measurement corruption further:
   initially order the color calibration pattern so patch colors having similar color attributes are adjacent to one another; or,
   initially order the color calibration pattern so that one or more of the number of patch colors that have a substantially extreme color attribute as compared to surrounding patch colors have a larger patch size than other of the number of patch colors do.

* * * * *

UNITED STATES PATENT AND TRADEMARK OFFICE
CERTIFICATE OF CORRECTION

PATENT NO. : 7,286,261 B2
APPLICATION NO. : 09/970278
DATED : October 23, 2007
INVENTOR(S) : Algird M. Gudaitis et al.

Page 1 of 1

It is certified that error appears in the above-identified patent and that said Letters Patent is hereby corrected as shown below:

In column 1, line 38, delete "Modem" and insert -- Modern --, therefor.

In column 4, line 10, delete "calorimeters" and insert -- colorimeters --, therefor.

In column 14, line 17, in Claim 12, delete "order" and insert -- orders --, therefor.

In column 14, line 21, in Claim 12, delete "order" and insert -- orders --, therefor.

Signed and Sealed this

Nineteenth Day of August, 2008

JON W. DUDAS
*Director of the United States Patent and Trademark Office*